United States Patent [19]

Shiraishi et al.

[11] Patent Number: 5,216,391
[45] Date of Patent: Jun. 1, 1993

[54] MSK MODULATOR HAVING A DIGITAL QUADRATURE REFERENCE WAVEFORM GENERATOR

[75] Inventors: Kenichi Shiraishi, Kawasaki; Souichi Shinjo, Yokohama; Shunichi Tada, Tokyo, all of Japan

[73] Assignee: Kabushiki Kaisha Kenwood, Tokyo, Japan

[21] Appl. No.: 872,283

[22] Filed: Apr. 22, 1992

[30] Foreign Application Priority Data

Apr. 26, 1991 [JP] Japan .................................. 3-125272
Jun. 28, 1991 [JP] Japan .................................. 3-184124

[51] Int. Cl.$^5$ ............................................. H04L 27/20
[52] U.S. Cl. ..................................... 332/101; 375/47; 375/64
[58] Field of Search ................. 332/100, 101, 102; 375/47, 62, 64

[56] References Cited

U.S. PATENT DOCUMENTS 4,897,620 1/1990 Paradise ............................. 332/100
5,022,054 6/1991 Wang ................................... 375/64

Primary Examiner—Siegfried H. Grimm
Attorney, Agent, or Firm—Sixbey, Friedman, Leedom & Ferguson

[57] ABSTRACT

An MSK modulator providing a high precision digital phase adjustment with a simple circuit structure. A sample data of a sine wave or cosine wave is read from a memory at an address calculated from an initial address value. The initial address value is set in accordance with the amount of phase to be adjusted. A predetermined number of sample data read from the memory is held, outputted in a predetermined order, and converted into an analog signal. The phase of the converted analog signal is adjusted, and thereafter multiplied by an input baseband signal. The multiplied result is outputted as a modulation signal.

4 Claims, 12 Drawing Sheets

MSK MODULATOR HAVING A DIGITAL QUADRATURE REFERENCE WAVEFORM GENERATOR

BACKGROUND OF THE INVENTION

Field of the Invention

The present invention relates to an MSK modulator, and more particularly to an MSK modulator having an improved reference wave generator.

An example of the structure of a typical, conventional MSK modulator is shown in FIG. 4. This MSK modulator receives dibit baseband digital signals I and Q and clocks (transmission rate clocks) having one half the symbol rate, and outputs a modulation signal.

FIG. 5 is a timing chart of transmission rate clocks, signals I and Q, and a reference wave.

Signals I and Q are inputted to analog multipliers 45 and 46, respectively, and multiplied by reference wave signals. Signals I and Q are NRZ signals, and processed as polar NRZ signals taking a value 1 or −1 by the analog multipliers 45 and 46. Representing the transmission rate of I and Q signals by $r_b$ (bps), signal Q is delaying from I signal by $1/(2r_b)$ sec.

Transmission rate clocks are inputted to a low-pass filter 41 to eliminate higher harmonics and obtain a sine wave signal having a frequency of $f_b(=r_b/2)$ which is supplied to a phase adjusting circuit 42. The phase adjusting circuit 42 adjusts the phase of the sine wave signal to make the zero-level points of the sine wave signal in phase with the level transition points of signal I. An output from the phase adjusting circuit 42 is called a reference wave having an initial phase 0 (rad), and represented by $\cos(2\pi f_b t)$. An analog phase shifter 43 shifts the phase of the reference wave $\cos 2\pi f_b t$ which is supplied to the multiplier 46. This signal is called a reference wave having an initial phase $-\pi/2$ (rad) whose zero-level points are in phase with the level transition points of signal Q.

If the transition points of signals I and Q are in correct phase with the zero-level points of reference waves, signals $S_I$ and $S_Q$ outputted from the multipliers 45 and 46 have continuous waveforms combining positive and negative half-period waves, as shown in FIG. 6A. However, if there is a phase shift of reference waves, signals $S_I$ and $S_Q$ are discontinuous as shown in FIG. 6B, adversely affecting an eye pattern on the receiving side and degrading the fixed deterioration characteristics.

The analog multiplier 45 multiplies signal I by the reference wave signal $\cos(2\pi f_b t)$ to output signal $S_I$, and the analog multiplier 46 multiplies signal Q by the reference wave signal $\sin(2\pi f_b t)$ to output signal $S_Q$.

A multiplier 47 multiplies signals $S_I$ by a carrier A $\cos(W_o t + \theta_o)$, and a multiplier 48 multiplies signal $S_Q$ a carrier A $\sin(W_o t + \theta_o)$ shifted by an analog phase shifter 44. An adder 49 adds together the output signals from the multipliers 47 and 48, and outputs an MSK modulation signal.

Such a conventional MSK modulator described above uses only the analog low-pass filter 41 to obtain reference wave signals from transmission rate clocks.

Transmission rate clocks contain odd-order higher harmonics of the reference wave frequency $f_b$, so that the frequency characteristics of the filter is required to be steep at its attenuation range as indicated at α in FIG. 3.

In order to make the frequency characteristics of a filter steep at its attenuation range, the order of the filter is required to be se high. With the high order filter, a change in delay time at the pass band becomes great. If the cut-off frequency changes because of the temperature characteristics of filter elements and the dispersion of element values, the delay time near the cut-off frequency changes greatly.

From the above reasons, the phase adjusting circuit 42 is provided to make the reference wave signals in phase with digital data. However, it is necessary for the adjustment range of this circuit 42 to be made broad as the dispersion of filter elements becomes large. As a result, the phase of the reference wave signals changes with the temperature characteristics of both the phase adjusting circuit and filter.

In view of the above circumstances, a digital circuit arrangement such as shown in FIG. 12 has been proposed.

In FIG. 12, a waveform data circuit 1281 stores waveform data of sine waves and cosine waves. Waveform data is read from the waveform data circuit 1281 in response to a clock supplied at a predetermined timing. The read-out waveform data is converted into an analog signal by a D/A converter 1282 operating in response to a clock supplied at the same predetermined timing. The analog signal is amplified by an operational amplifier 1283, and unnecessary higher harmonics of the analog signal are eliminated by a low-pass filter 1284. Thereafter, the analog signal is supplied to a multiplier 1285 to multiply baseband signal I or Q by $\cos(\pi t/2T_b)$ or $\sin(\pi t/2T_b)$ to obtain signal $S_I$ or $S_Q$.

In the digital circuit arrangement shown in FIG. 12, clocks for MSK modulation are obtained digitally. However, since analog signals are obtained by using the D/A converter 82, operation amplifier 83, and low-pass filter 84, there is a time delay at this analog circuit portion which delay difficult to be estimated.

A circuit arrangement compensating for such a time delay is known which is shown in FIG. 13. This circuit has a delay circuit 1386 for delaying timing clocks to be supplied to a D/A converter 1382, a latch circuit 1388 for latching a baseband signal I or Q, and a delay circuit 1387 for delaying transmission rate clocks and controlling the latch timing of the latch circuit 1388.

In this circuit arrangement, the timings of baseband signals are delayed by the delay circuit 1387 and latched by the latch circuit 1388, and the conversion timings of the D/A converter 1382 are delayed by the delay circuit 1386, to thereby adjust the phases of baseband signals and reference wave signals.

However, such a circuit arrangement complicates the delay circuits if timings are intended to be finely adjusted.

A general delay circuit has the structure such as shown in FIG. 14. A plurality of fixed delay elements 1401, 1402, 1403, 1404, . . . are connected in cascade. One of the outputs of the fixed delay elements is selected by, and outputted from, a selector 1400 to adjust delay time. A large number of fixed delay elements are required in order to provide fine delay time adjustment, resulting in a complicated circuit and high cost. Furthermore, a large number of fixed delay elements connected in cascade results in a large output load of ICs so that waveforms of clocks are deformed and a delay time cannot be adjusted reliably.

SUMMARY OF THE INVENTION

According to one aspect of the present invention, a reference wave generated in a digital manner by a digital reference wave generator is multiplied by a dibit baseband signal to perform an MSK modulation with an improved delay characteristic and stable operation. Over-sample data is used to obtain reference wave data which is converted into an analog signal by a D/A converter and passed through a low-pass filter. The signal outputted from the low-pass filter is used as the digital reference wave.

According to another aspect of the present invention, there is provided an MSK modulator having a digital phase adjusting circuit, the digital phase adjusting circuit comprising: a memory for storing sample data of one of a sine wave and a cosine wave; an initial value setting circuit for setting an initial address value of the memory; a read circuit for outputting a predetermined address signal to the memory in accordance with the initial address signal to the memory in accordance with the initial address value from the initial value setting circuit; a waveform data circuit for holding a predetermined number of the sample data read from the memory and outputting the predetermined number of the sample data in a predetermined order; a converter circuit for converting the data from the waveform data circuit into an analog signal; and a multiplier circuit for multiplying an output signal from the converter circuit by an input baseband signal and outputting the multiplied result. A sample data of a sine wave or cosine wave is read from the memory at an address calculated from an initial address value. The initial address value is set in accordance with the amount of phase to be adjusted. A predetermined number of sample data read from the memory is held, outputted in a predetermined order, and converted into an analog signal. The phase of the converted analog signal is adjusted, and thereafter multiplied by an input baseband signal. The multiplied result is outputted as a modulation signal.

DETAILED DESCRIPTION OF THE EMBODIMENTS

Preferred embodiments of the present invention will be described with reference to the accompanying drawings.

Figure 1:
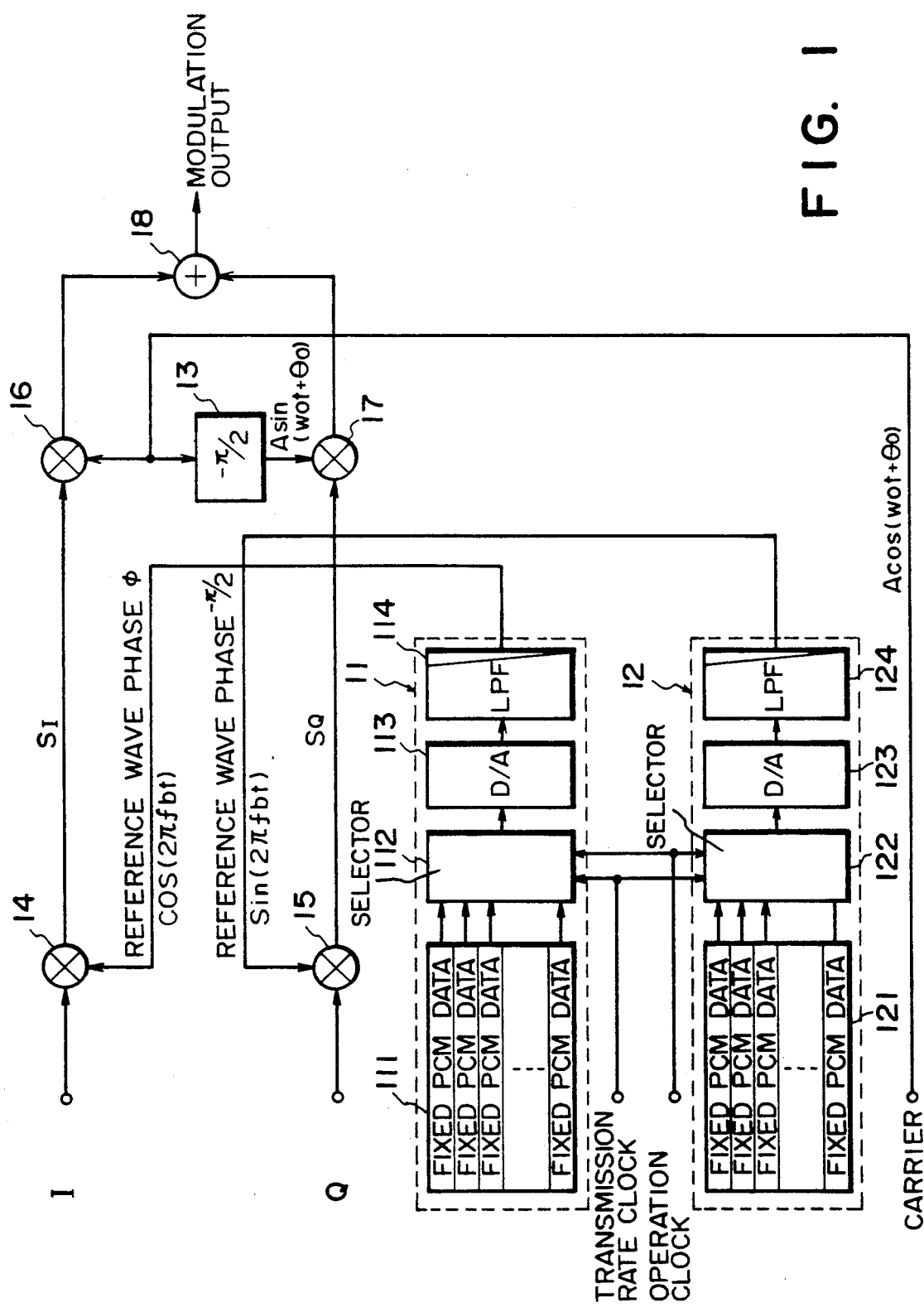
FIG. 1 is a block diagram showing an embodiment of a MSK modulator according to the present invention.

FIG. 1 is a block diagram showing an embodiment of a parallel MSK modulator according to the present invention.

Figure 4:
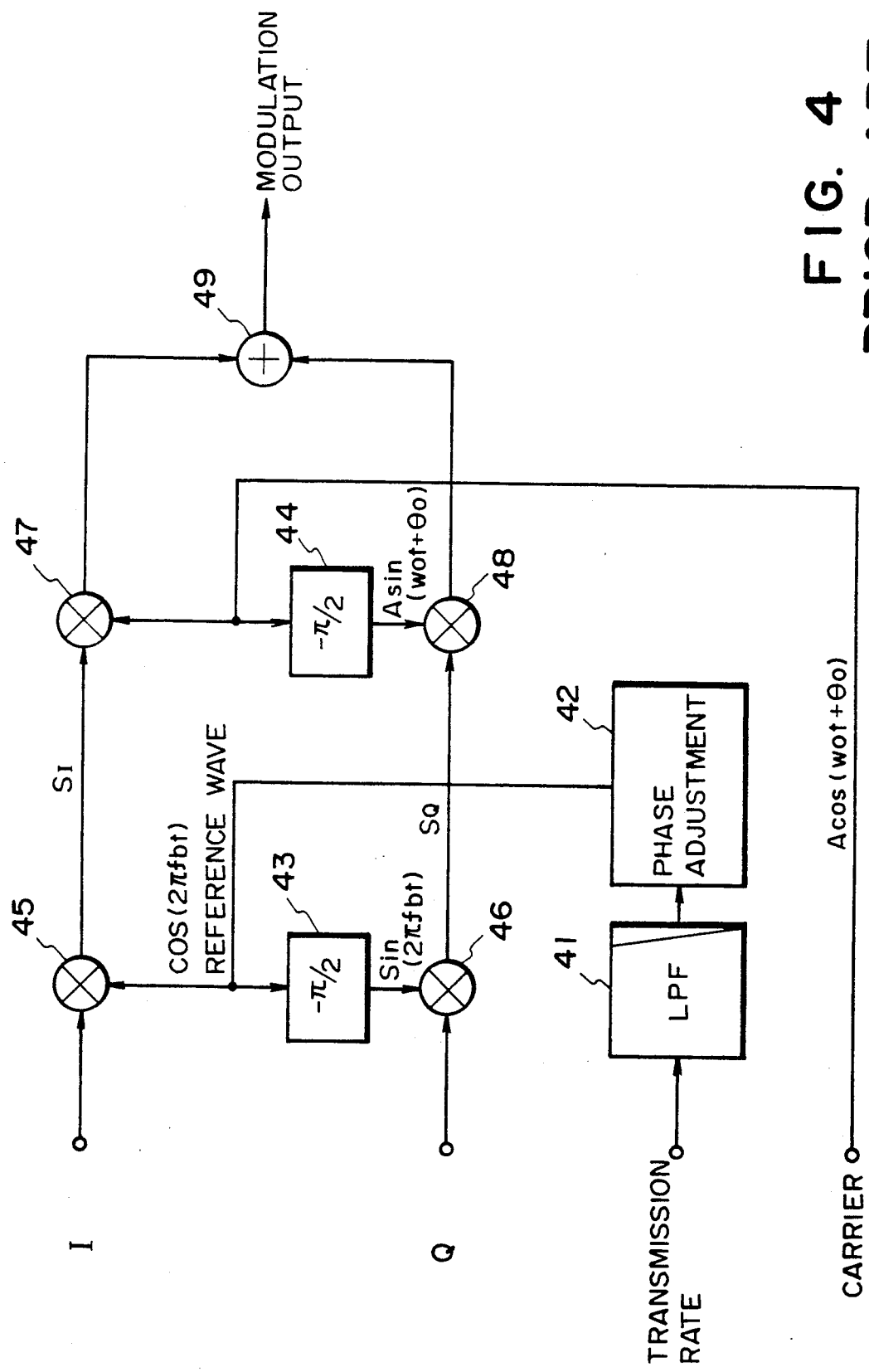
FIG. 4 is a block diagram showing a conventional parallel MSK modulator.

Referring to FIG. 1, multipliers 14, 15, 16 and 17 have the same function as the multipliers 45, 46, 47 and 48 shown in FIG. 4. An analog phase shifter 13 and adder 18 have the same function as the analog phase shifter 44 and adder 49 shown in FIG. 4.

This embodiment has digital processing units 11 and 12 for generating references waves $\cos(2\pi f_b t)$ having a phase 0 and $\sin(2\pi f_b t)$ having a phase $-\pi/2$ to be supplied to the multipliers 14 and 15.

A digital reference wave generator 11 is constructed of a fixed PCM data memory 111 for storing reference wave digital data, a selector 112 for selecting predetermined data stored in the memory 111 in response to a transmission rate clock and operation (master) clock, a D/A converter 113 for converting the digital data selected by the selector 112 into an analog signal, and a low-pass filter (LPF) 114 for deriving a low frequency component from the analog signal obtained from the D/A converter 113. Similarly, the digital reference wave generator 12 is constructed of a memory 121, selector 122, D/A converter 123, and LPF 124.

Figure 2:
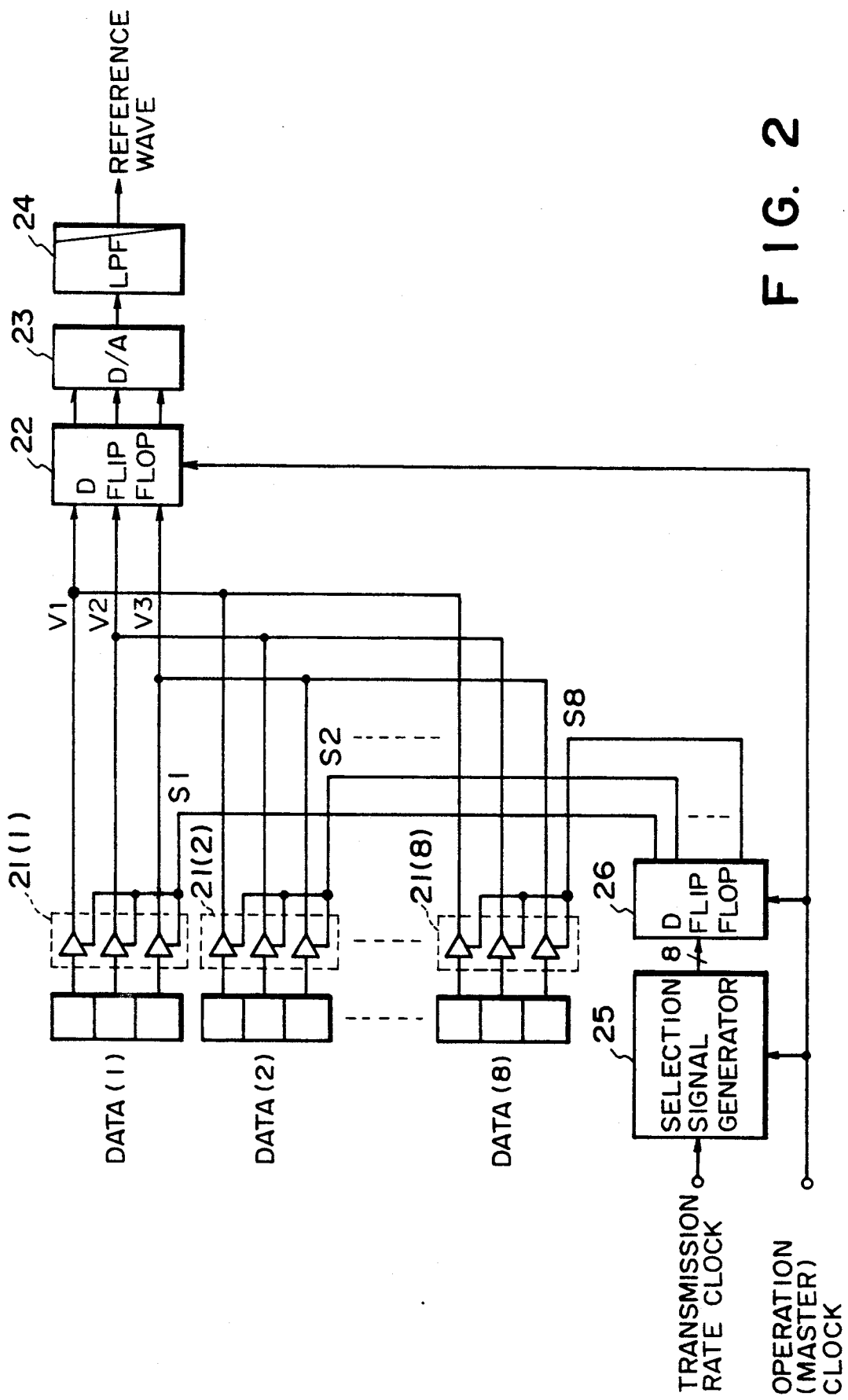
FIG. 2 is a block diagram showing the details of the reference wave generator shown in FIG. 1.

The details of the digital reference wave generators 11 and 12 are shown in FIG. 2, both generators having the same structure.

Figure 5:
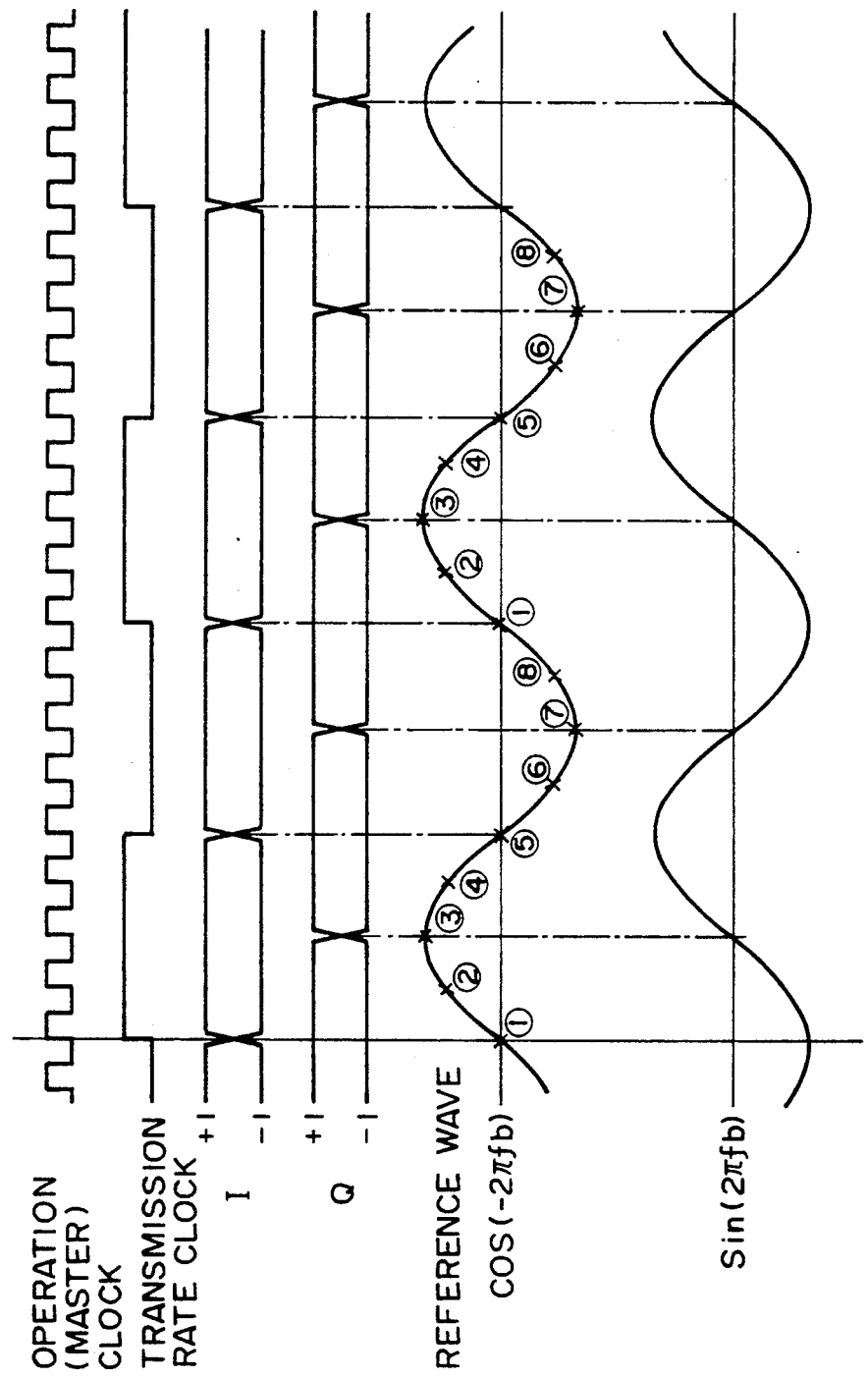
FIG. 5 is a timing chart of signals of parallel MSK modulators shown in FIGS. 1 and 4.
Figure 6:
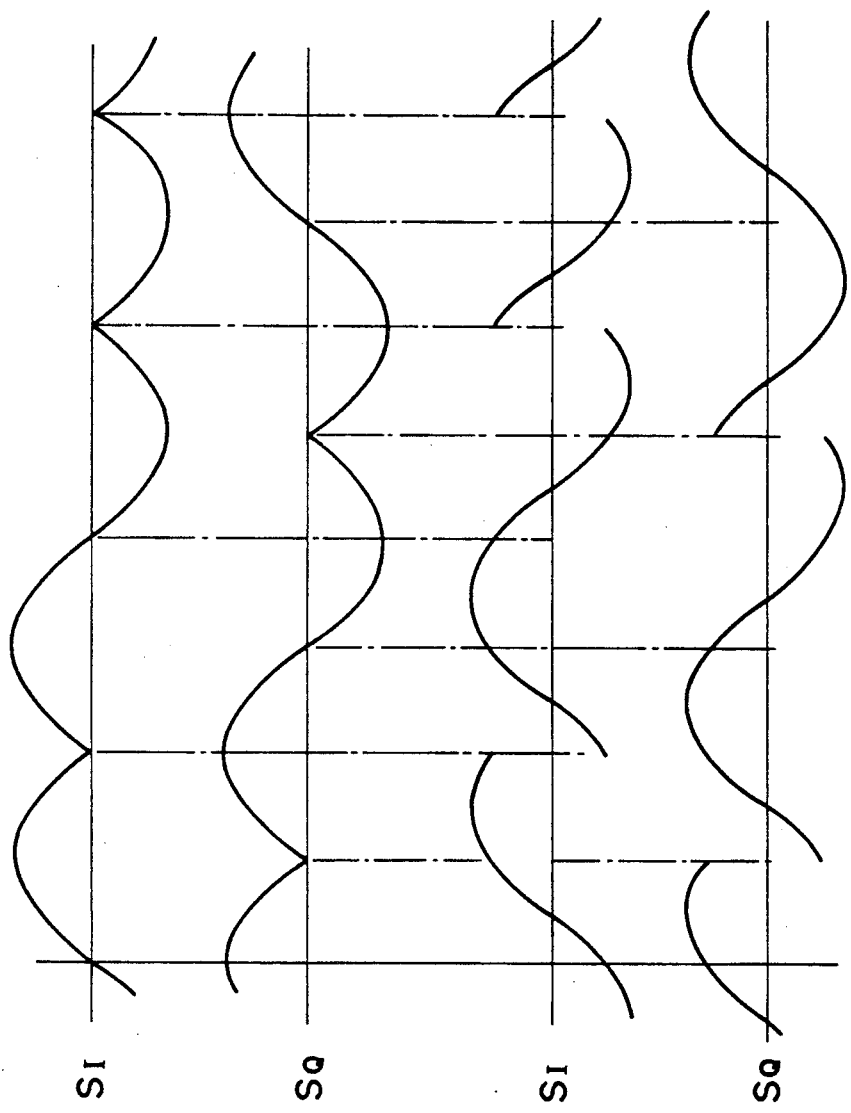
FIGS. 6A and 6B show waveforms of outputs $S_I$ and $S_Q$ from the analog multipliers shown in FIG. 4.

In this embodiment, eight samples per one period are used as the fixed PCM data, one sample having three bits. The fixed PCM data corresponds to the data of a reference wave sampled at sampling points (1) to (8) shown in FIG. 5, the sampling clock being the same as the operation clock.

Tri-state buffer groups 21(1), 21(2), ..., 21(8) for the data (1) to (8) each take one of three states relative to the fixed PCM data in response to control signals S1, S2, ..., S8 from a D-type flip-flop group 26.

A selection signal generator 25 receives the transmission rate clock and operation clock, and generates selection signals for selecting one of the data groups (1) to (8). The D-type flip-flop group 26 receives the selection signals and outputs the control signals to the tri-state buffer groups 21(1) to 21(8), in response to the operation clock.

A D-type flip-flop group 22 adjusts the timings of data V1, V2 and V3 selected by and outputted from each tri-state buffer group 21(1) to 21(8) in order to cancel delays of the data.

The digital data outputted from D-type flip-flop 22 is converted into an analog signal in D/A converter 23, and unnecessary higher harmonics are eliminated by a low-pass filter 24 to output a reference wave signal.

In the parallel MSK modulator of this embodiment, two reference waves having initial phases 0 (rad) and $-\pi/2$(rad) are used. In order to generate a reference wave having the initial phase of $-\pi/2$ (rad), the selection signals S1 to S8 are delayed by $\pi/2$ (rad) from those used for generating the reference wave having the initial phase 0 (rad), or the data (1) to (8) are replaced in order so as to obtain the data delayed by π/2 (rad). Therefore, it is not required to have an analog shifter.

One of the control signals S1 to S8 takes a high "H" level, and the other seven control signals take a low "L" level. Therefore, one of the tri-state buffer groups 21 (1) to 21 (8) becomes active, and the other tri-state buffer groups become high impedance. None of the outputs of the tri-state buffer groups collides with another of the outputs, since there is always just one of the data (1) to (8) put out as the signals V1 to V3.

Figure 3:
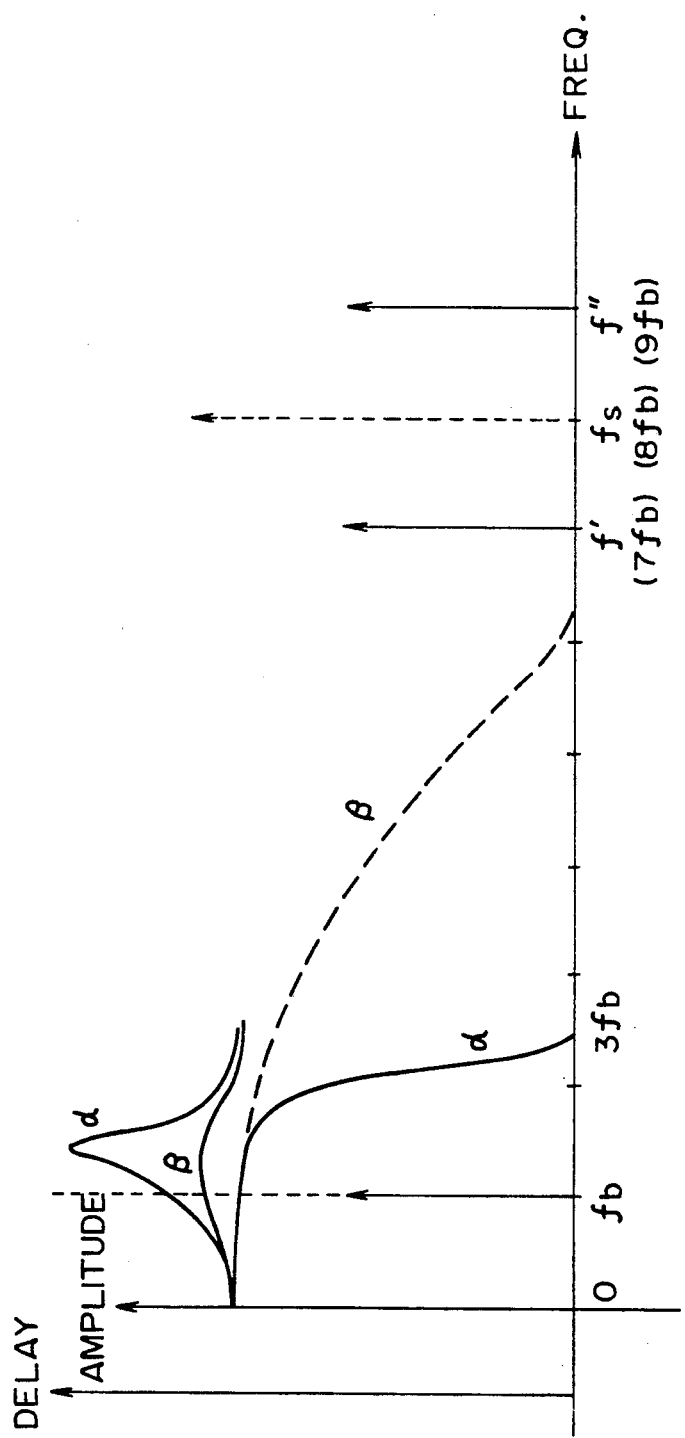
FIG. 3 is a graph showing the frequency-amplitude characteristic and frequency-delay characteristics of low-pass filters to be used in an MSK modulator.

The relation between the frequency $f_s$ of the operation clock (conversion rate) for the D/A converter and the frequency $f_b$ of the reference wave is required to satisfy $f_s \geq 2f_b$ according to the sampling theorem. In the example shown in FIG. 2, eight values are sampled during one period of a reference wave, and so $f_s = 8f_b$ (four-fold over-sampling). It is therefore sufficient if the low-pass filter has the characteristic indicated at $\beta$ shown in FIG. 3 for eliminating the frequency equal to or higher than f' $(f_s - f_b)$.

The higher the order of a filter and the gentler the characteristic of the filter at an attenuation range, the less a change in attenuation amount at the pass band and the less a change in attenuation amount caused by dispersion of filter element values. In addition, the number of filter elements is reduced so that a change of the filter characteristics caused by temperature is less. With this embodiment, it is possible to realize a filter whose delay is less influenced by temperature and dispersion of filter element values. Therefore, the phase difference between the reference wave and data becomes very small as compared with a conventional analog type MSK modulator, without a need of an adjusting circuit.

Furthermore, the circuit arrangement shown in FIG. 2 uses tri-state buffers for setting fixed data and for selecting it. Therefore, storage devices such as ROMs and RAMs dedicated to storing fixed data are not necessary. In addition, even if the amount of data increases, the delay time from when a control signal is changed to when output data is established, is constant. This delay time $t_{pd}$ can be expressed in terms of operation clock, by:

$t_{pd} = t_{pf}$ (delay time from a clock input to an output, at D-type flip-flop) + $t_{pd}$ (delay time from a control input to an output, at tri-state buffer)

The sum of the delay time $t_{pd}$ and the setup time $t_s$ of the D-type flip-flop is required to be smaller than the operation clock period $T(=1/f_s)$, namely:

$T > t_{pd} + t_s$

The delay time $t_{pd}$ from a control input to an output, at the tri-state buffer, is constant irrespective of the number of data (number of tri-state buffers).

On the other hand, if a multiplexer is used for data selection, the delay time $t_{pd}$ is expressed by:

$t_{pd} = t_{pf} + t_{tx}$ (delay time from a control input to an output, at a multiplexer).

Generally, the delay time $t_{px}$ is a function of the number of input data, and becomes longer as the number of data increases. If a selector constructed of tri-state buffers is used as in this embodiment, the upper limit of the operation clock will not change even if the number of data increases. It is therefore possible for the circuit to operate at a higher speed than using a multiplexer.

With the above-described circuit arrangement, a phase difference between data and reference waves becomes smaller than a conventional circuit arrangement, to thereby provide a parallel MSK modulator having a good reproducibility without a need of a complicated phase adjusting circuit, and make it easy to mass-produce MSK systems with less fixed deterioration.

Figure 7:
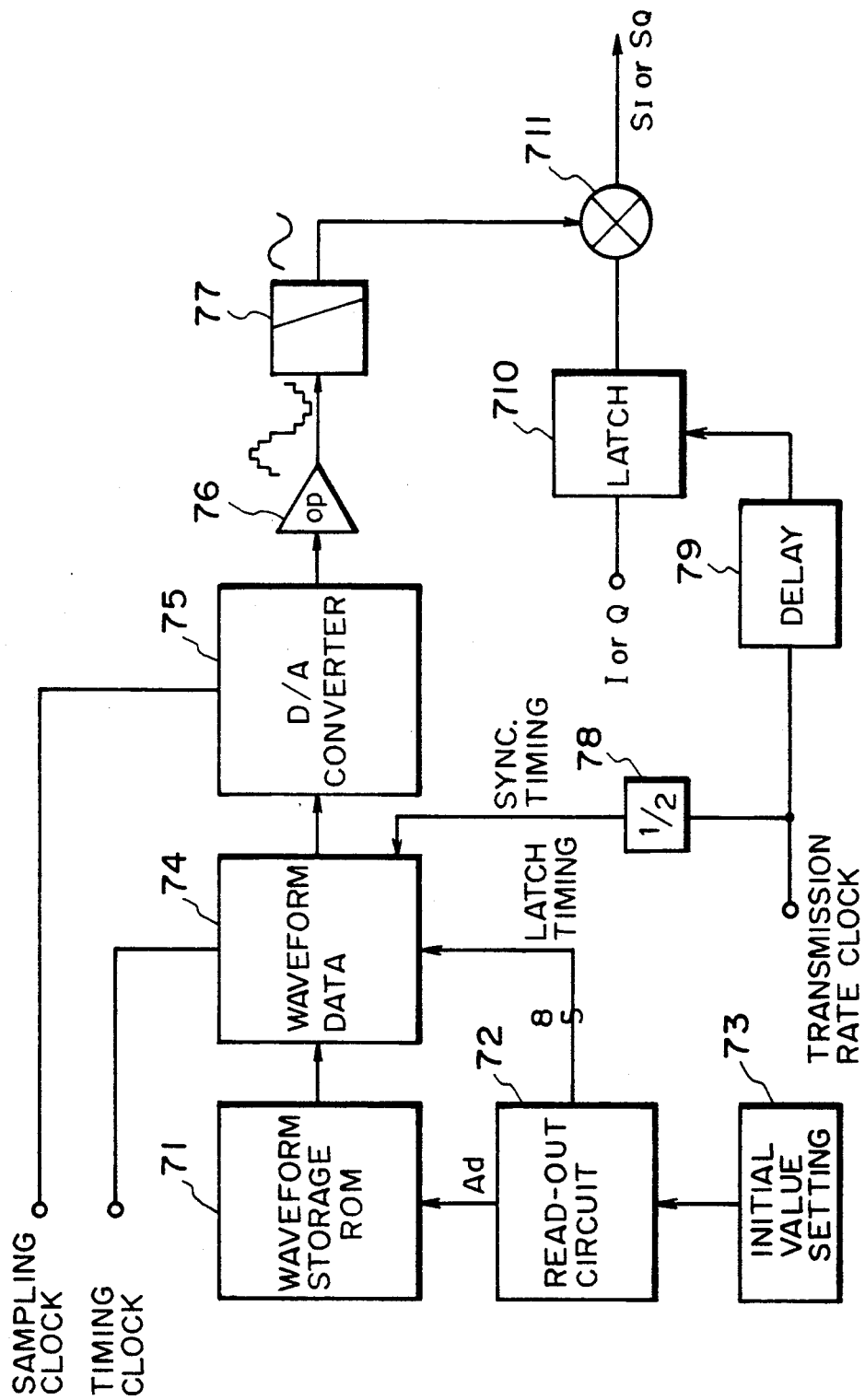
FIG. 7 is a block diagram showing another embodiment of a digital phase adjusting circuit of an MSK modulator according to the present invention.

FIG. 7 is a block diagram showing another embodiment of the digital phase adjusting circuit of an MSK modulator.

A ROM 71 stores sine wave data (sample data), eight sample data per one period. A desired data is read using an address signal Ad from a read circuit 72, and supplied to a waveform data circuit 74. The waveform data circuit 74 receives a timing clock, a latch timing signal from the read circuit 2, and a synchronizing timing signal obtained by dividing the transmission rate clock by ½ at a frequency divider 78, and periodically outputs the sample data read from ROM 71 to D/A converter 75. The read circuit 72 sequentially supplies address signals to ROM 71 in accordance with an initial value supplied from an initial value setting circuit 73, and supplies latch timing pulses to the waveform data circuit 74 to latch eight sample data. For example, assuming that the sampling clock is n Hz and the analog signal outputted from the D/A converter 75 is a sine wave of n/8 Hz, there are eight sample data per one period so that the waveform data circuit 74 periodically outputs eight sample data to the D/A converter 75. The analog signal converted by the D/A converter 75 synchronously with sampling clocks of n Hz is amplified by an operational amplifier 76, and unnecessary frequency components are eliminated by a low-pass filter 77. Thereafter, the analog signal is supplied to a multiplier 711.

The transmission rate clock is delayed by a delay circuit 79 by a predetermined time period, and supplied as a latch timing signal to a latch 710. A baseband signal I or Q is latched by the latch 710 and supplied to the multiplier 711 at which the baseband signal I or Q is multiplied by the signal from the low-pass filter 77 to output a signal $S_I$ or SQ.

Figure 8:
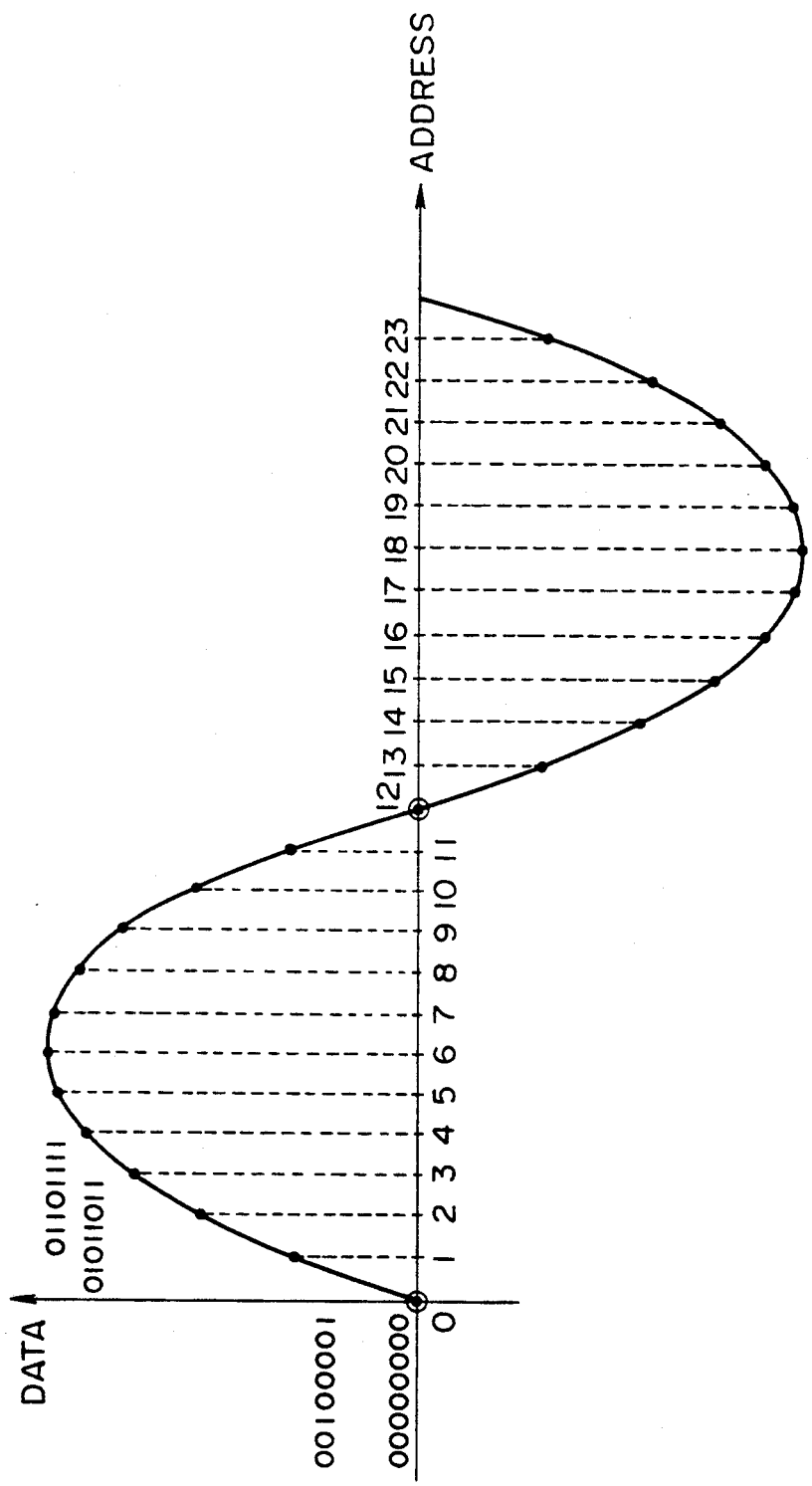
FIG. 8 is a graph showing sample data stored in ROM used in the embodiment shown in FIG. 7.

FIG. 8 shows an example of waveform data stored in ROM 71. The abscissa represents an address of ROM 71, and the ordinate represents sample data. In this example, a sine wave during one period is divided by 24 (eight sample data * m (m=3) and stored.

First, the initial value at the initial value setting circuit 73 is set to "0". The read circuit 72 supplies address "0" to ROM 1. Then, sample data "00000000" at address "0" is supplied to the waveform data circuit 74 and held as the first data in response to the latch pulse.

Next, the read circuit 72 adds m (m=3) to the initial value "0", and supplies the result address "3" to ROM 71. Then, sample data "01011011" at address "3" is supplied to the waveform data circuit 74 and held as the second data.

Similarly, the read circuit 72 adds m (m=3) to the previous addition result 23", and supplies the result address "6" to ROM 71. Then, sample data "01111111" at address "6" is supplied to the waveform data circuit 74 and held as the third data.

Figure 9:
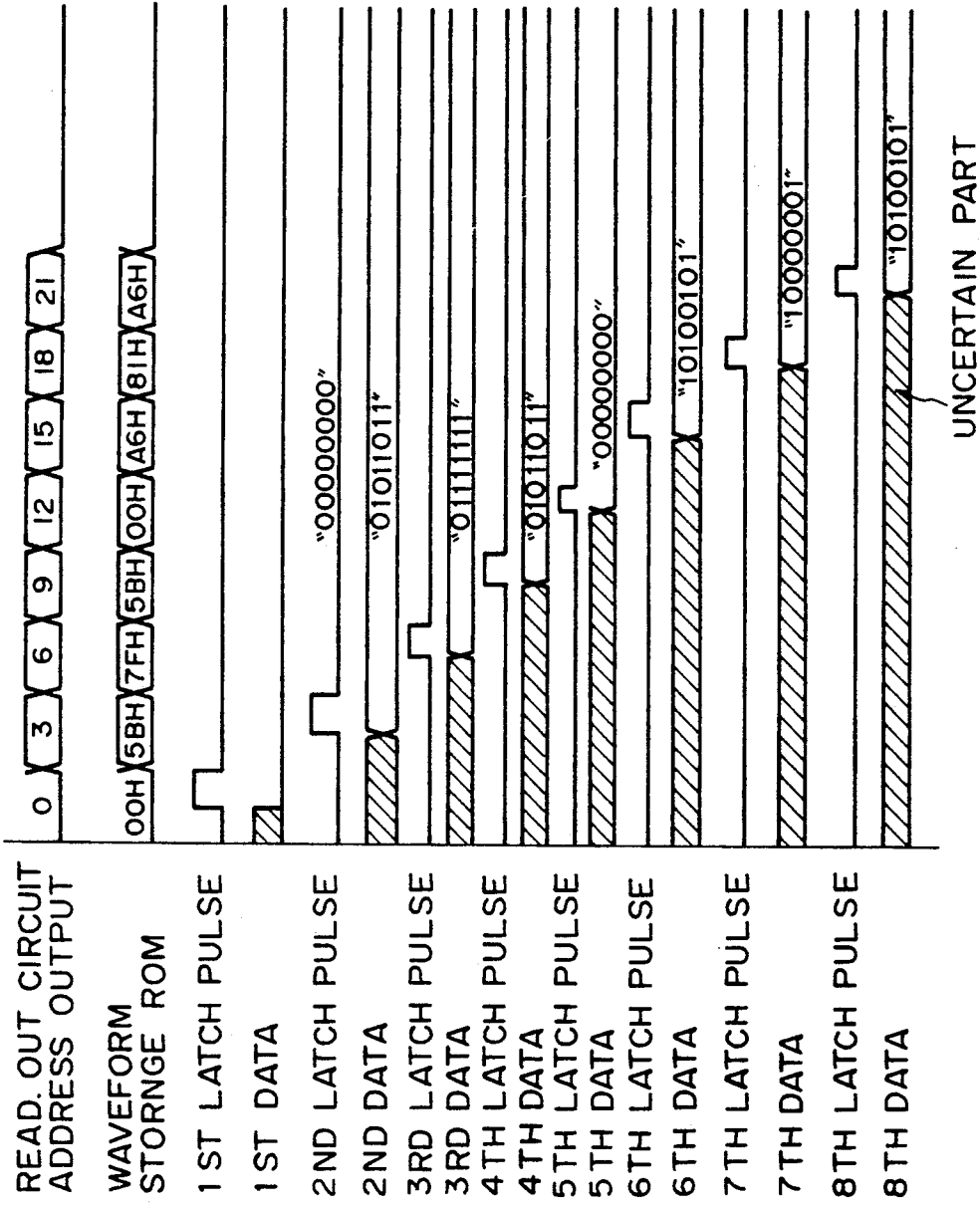
FIG. 9 is a timing chart explaining the operation of the embodiment shown in FIG. 7.

FIG. 9 is a timing chart illustrating the above-described operation. The above operation is repeated to sequentially hold eight sample data from the first to eighth data in the waveform data circuit 74.

The waveform data circuit 74 sequentially sends eight sample data in response to the timing clock, using the synchronizing timing signal as a reference. This operation is repeated so that the D/A converter 75 outputs a sine wave of n/8 Hz.

Figure 10:
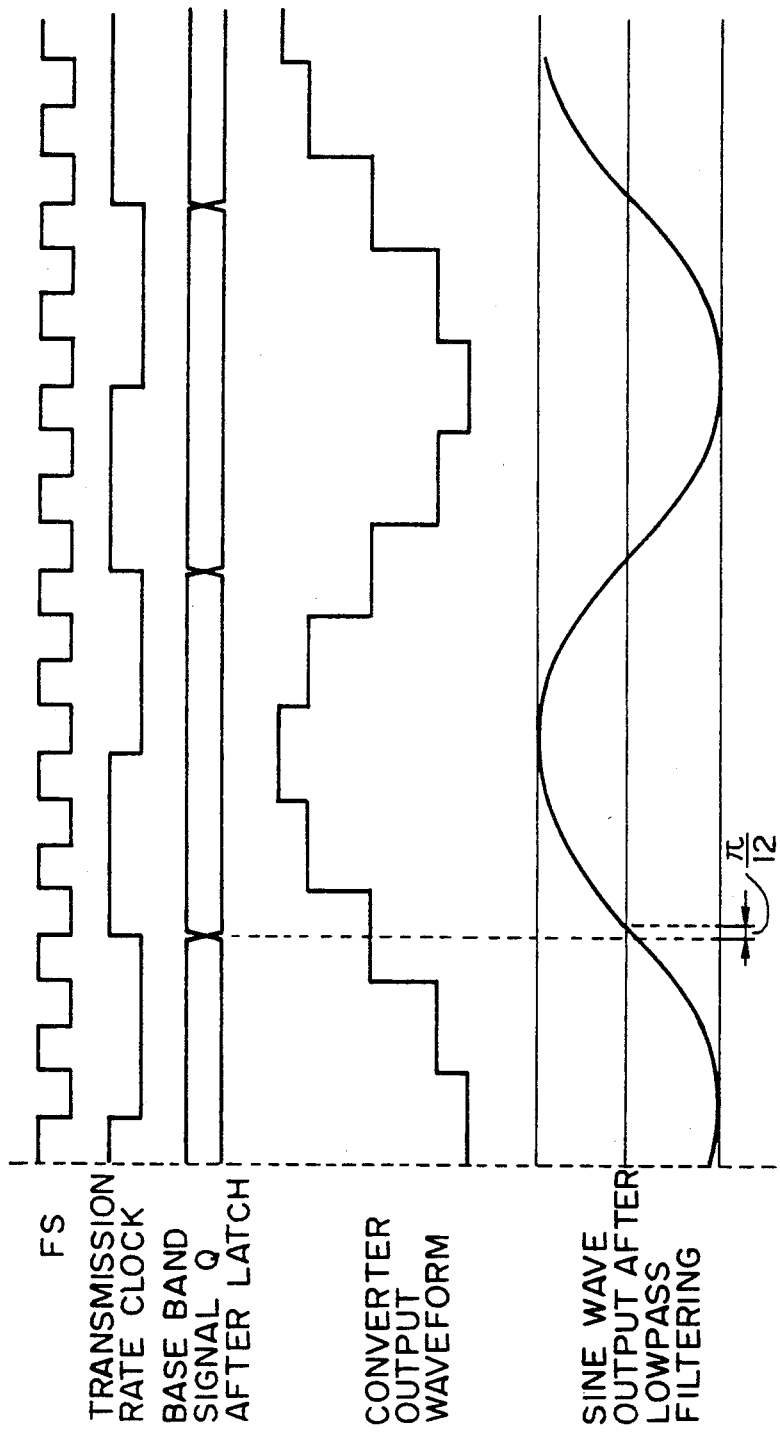
FIG. 10 is a timing chart explaining the operation of the embodiment shown in FIG. 7 without phase adjustment.

FIG. 10 is a timing chart of f signal, transmission rate clock, latched baseband signal Q, output of D/A converter 75, and output of low-pass filter 77, without phase adjustment.

In the example shown in FIG. 10, the transition point of the baseband signal Q changing in response to transmission rate clocks is being delayed by $\pi/12$ from the "00000000" point of the sine wave outputted from the low-pass filter 77, in spite of that both the points are required to be coincident.

The operation of the digital phase adjusting circuit shown in FIG. 7 for adjusting such a phase delay of $\pi/12$ will be described below.

First, the initial value at the initial value setting circuit 73 is set to "1". The read circuit 72 supplies address "1" to ROM 1. Then, sample data "01000001" at address 21" is supplied to the waveform data circuit 74 and held as the first data.

Next, the read circuit 72 adds "3" to the initial value "1", and supplies the result address "4" to ROM 71. Then, sample data "01101111" at address "4" is supplied to the waveform data circuit 74 and held as the second data.

Similarly, the read circuit 72 adds "3" to the previous addition result "4", and supplies the result address "7" to ROM 71. Then, sample data "01111100" at address "7" is supplied to the waveform data circuit 74 and held as the third data.

The above operation is repeated to hold eight sample data per one period of the sine wave in the waveform data circuit 74.

In response to the synchronizing timing signal similar to that shown in the timing chart of FIG. 10, the sample data is sequentially sent from the waveform data circuit 74 to the D/A converter 75 to convert the sample data into analog data.

Figure 11:
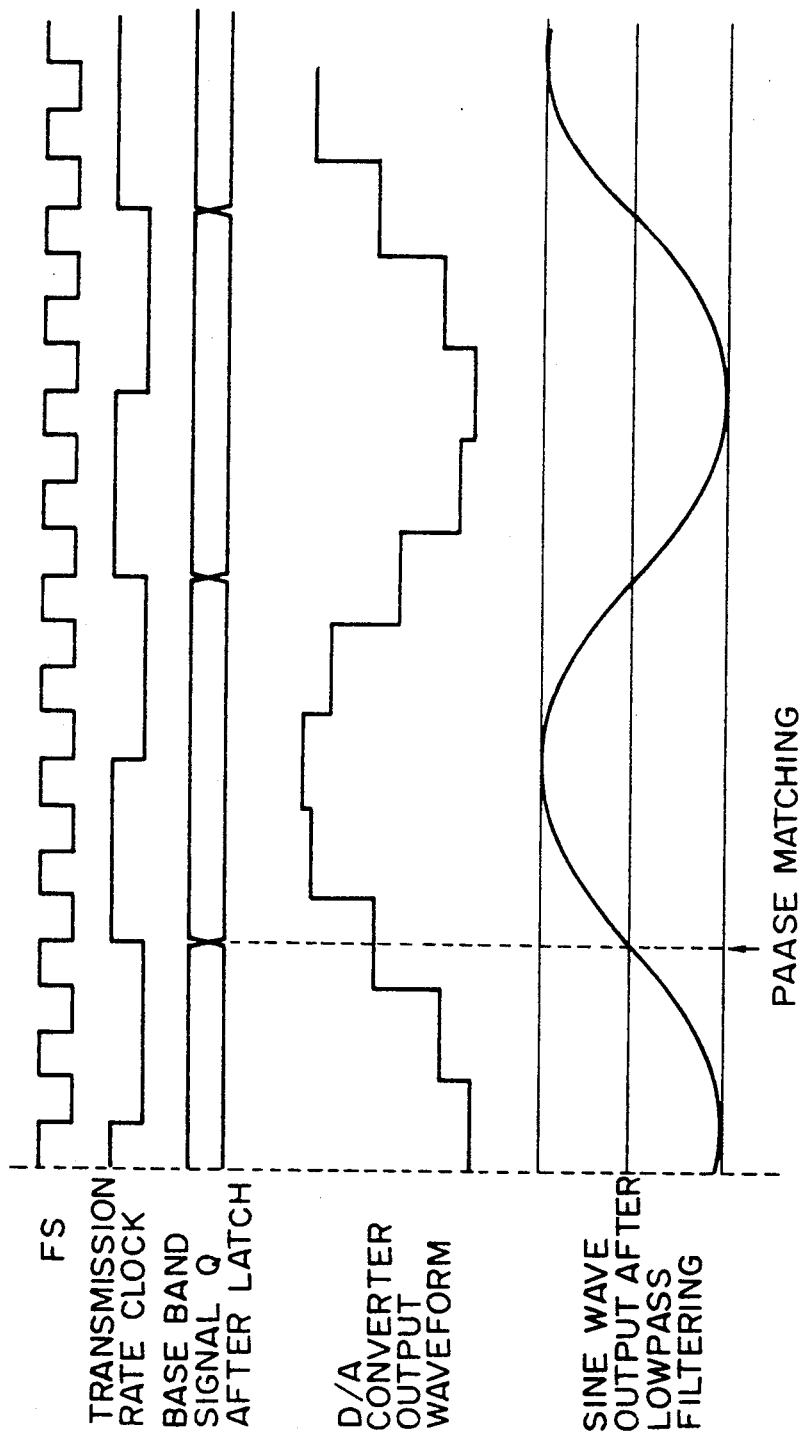
FIG. 11 is a timing chart explaining the operation of the embodiment shown in FIG. 7 with phase adjustment.
Figure 12:
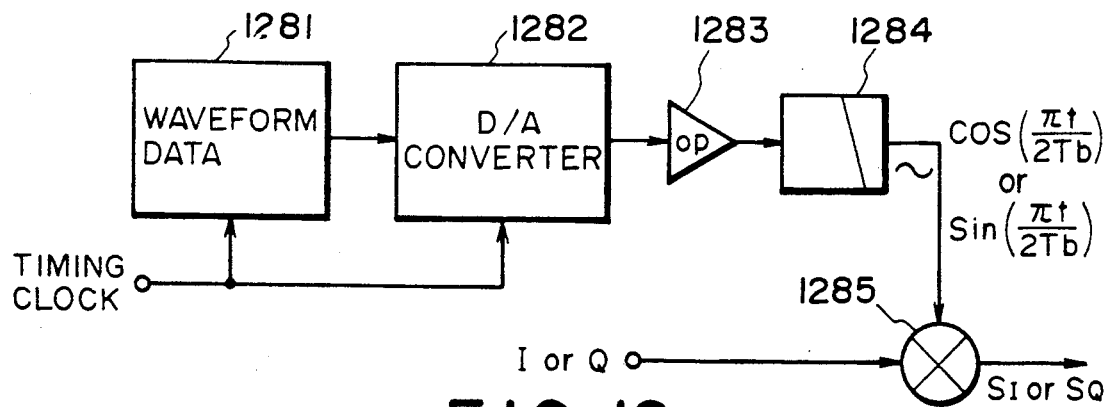
FIG. 12 shows an example of a conventional reference wave generator.
Figure 13:
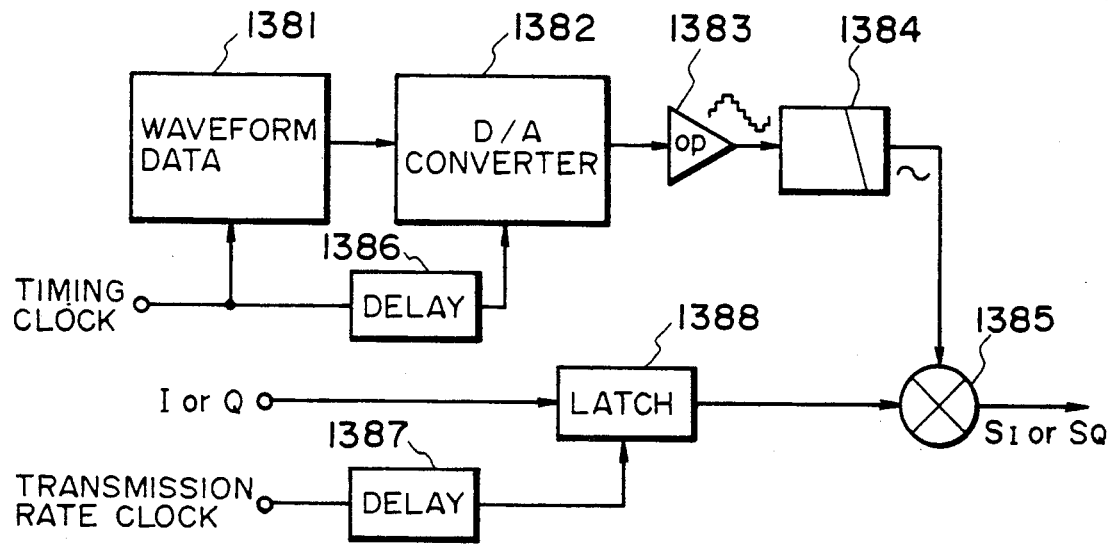
FIG. 13 and 14 show examples of a conventional phase adjusting circuit for reference waves.
Figure 14:
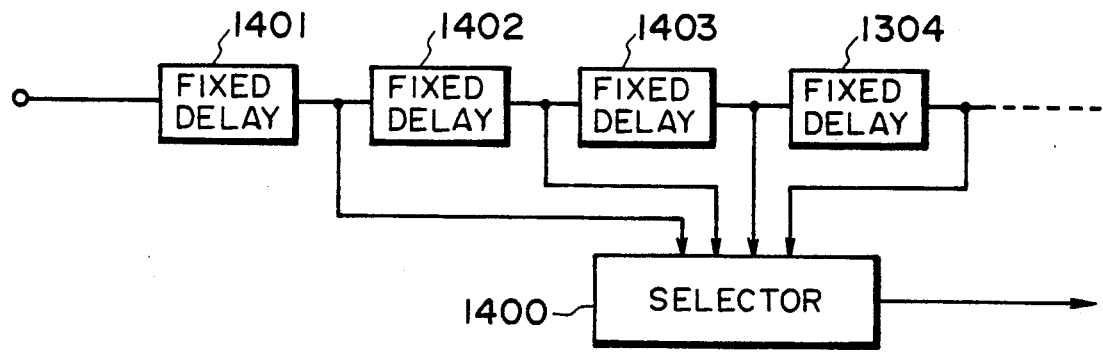

FIG. 11 is a timing chart similar FIG. 10, with phase adjustment.

According to the above embodiment, the phase of the sine wave delayed by $\pi/12$ from transition point of the baseband signal Q is advanced by $\pi/12$ to hold them in phase, without changing the timings of the digital circuit and only by changing sine wave sample data to be outputted from the D/A converter 75. A similar phase adjustment operation is carried out for the baseband signal I and cosine wave.

The delay circuit 79 shown in FIG. 7 eliminates a relative phase error between orthogonal baseband signals.

The phase adjustment is carried out by the following procedure. First, a repetitive signal having a frequency on half the transmission rate is inserted into the baseband signals I and Q, to check if the baseband signal I is being delayed from the baseband signal by $\frac{1}{2}$ data ($\pi/2$) and finely adjust the relative phase at their delay circuits 79. Next, the phase data of the cosine wave is adjusted such that the transition point of the baseband signal I becomes coincident with the center point of the cosine wave to be multiplied by the signal I. Similarly, the phase data of the sine wave is adjusted such that the transition point of the baseband signal Q becomes coincident with the center point of the sine wave to be multiplied by the signal Q.

The advantageous effects of this embodiment will now be described. Consider the case where the transmission rate Tb of the baseband signal is 12 Mbps, $F_s$ is 48 MHz, the frequency of cos $(\pi/2Tb)$ and sin $(\pi t/2Tb)$ is 6 MHz ($f_s/8$), the resolution of D/A converter is 8 bits, the waveform storage ROM has address 0 to 255 ($2^N$, N is the resolution of D/A converter) and eight-bit words. The precision of phase adjustment can be in the order of 167 ns/28=0.65 ns, or 360 degrees/28=1.4 degree with respect to the wavelength of the sine wave or cosine wave.

As above, a stable operation and precision with a small hardware scale can be obtained by using the digital phase adjusting circuit of the embodiment, rather than by using a conventional analog phase adjusting circuit having delay elements of many stages and its selector to adjust the phase of sine or cosine wave.

As described above, provides a high precision digital phase adjustment with a simple circuit arrangement, particularly suitable for use with MSK modulator systems.

What is claimed is:

1. An MSK modulator performing a process of multiplying a dibit baseband signal by a reference wave signal obtained from a clock signal having a symbol rate, comprising
    a digital reference wave generator for generating in a digital manner said reference wave signal.

2. An MSK modulator according to claim 1, wherein said digital reference wave generator generates reference wave data in accordance with over-sample data, converts said generated reference wave data into an analog signal at a D/A converter, and outputs said analog signal passed through a low-pass filter as said reference wave signal.

3. An MSK modulator according to claim 2, further comprising a plurality of fixed data memories for storing fixed values to be inputted to tri-state buffers, said tri-state buffers selecting desired data from said plurality of fixed data memories and outputting said selected desired data to said D/A converter.

4. An MSK modulator having a digital phase adjusting circuit, said digital phase adjusting circuit comprising:
    a memory for storing sample data of one of a sine wave and a cosine wave;
    an initial value setting circuit for setting an initial address value of said memory;
    a read circuit for outputting a predetermined address signal to said memory in accordance with said initial address value from said initial value setting circuit;
    a waveform data circuit for holding a predetermined number of said sample data read from said memory and outputting said predetermined number of said sample data in a predetermined order;
    a converter circuit for converting said data from said waveform data circuit into an analog signal; and
    a multiplier circuit for multiplying an output signal from said converter circuit by an input baseband signal and outputting the multiplied result.

* * * * *